United States Patent [19]

Knowlton et al.

[11] Patent Number: 5,666,929
[45] Date of Patent: Sep. 16, 1997

[54] FUEL VAPORIZER FOR AN INTERNAL COMBUSTION ENGINE

[75] Inventors: James L. Knowlton, Whitehall; Alan J. Workman, Muskegon, both of Mich.

[73] Assignee: Tyma, Inc., Muskegon, Mich.

[21] Appl. No.: 482,219

[22] Filed: Jun. 7, 1995

[51] Int. Cl.$^6$ .................................................. F02M 31/00
[52] U.S. Cl. ................................. 123/546; 123/549
[58] Field of Search ................................... 123/543, 546, 123/547, 549, 552, 590

[56] References Cited

U.S. PATENT DOCUMENTS

| | | |
|---|---|---|
| 504,723 | 9/1893 | Gray . |
| 1,311,532 | 7/1919 | Schmid . |
| 1,456,018 | 5/1923 | Wiegand . |
| 1,627,671 | 5/1927 | Shore . |
| 1,724,481 | 8/1929 | Heginbottom et al. . |
| 2,139,777 | 12/1938 | Skok et al. . |
| 2,716,399 | 8/1955 | Rothwell . |
| 3,667,436 | 6/1972 | Reichhelm . |
| 4,133,172 | 1/1979 | Cataldo ..................... 123/546 |
| 4,187,264 | 2/1980 | Diener . |
| 4,187,819 | 2/1980 | Longobardi . |
| 4,192,270 | 3/1980 | Beckman . |
| 4,224,904 | 9/1980 | Clerk . |
| 4,336,783 | 6/1982 | Henson . |
| 4,348,338 | 9/1982 | Martinez et al. . |
| 4,355,622 | 10/1982 | Inoue . |
| 4,368,163 | 1/1983 | Covey ........................ 123/546 |
| 4,375,801 | 3/1983 | Eckman . |
| 4,409,951 | 10/1983 | Whitworth . |
| 4,412,521 | 11/1983 | Silva .......................... 123/547 |
| 4,438,750 | 3/1984 | Sviridov et al. ............ 123/546 |
| 4,463,742 | 8/1984 | Williams . |
| 4,491,552 | 1/1985 | Wessel ....................... 123/552 |
| 4,538,583 | 9/1985 | Earl . |
| 4,637,365 | 1/1987 | Yunick . |
| 4,715,354 | 12/1987 | Longobardi . |
| 4,870,249 | 9/1989 | Kayanuma et al. . |
| 4,883,040 | 11/1989 | Rocky . |
| 5,038,742 | 8/1991 | Uddin ......................... 123/552 |
| 5,123,398 | 6/1992 | Klaus et al. ............... 123/543 |
| 5,218,944 | 6/1993 | Leonard ..................... 123/552 |
| 5,320,519 | 6/1994 | Bang et al. ................ 123/543 |
| 5,398,663 | 3/1995 | Kulasinghe ................ 123/549 |

OTHER PUBLICATIONS

Secrets of the 200 MPG Carburetor, Revised Edition, 1984.
Secrets of the "17" Super Mileage Carburetors, 1984.
"Racing to Save Gas", The Detroit News, Oct. 13, 1993, pp. 1D and 3D.

Primary Examiner—Marguerite McMahon
Attorney, Agent, or Firm—Price, Heneveld, Cooper, DeWitt & Litton

[57] ABSTRACT

A fuel vaporization device for an internal combustion engine comprising a vaporization chamber, a liquid fuel inlet to the chamber including a fuel distributor having the capacity to inject tiny fuel droplets into the chamber, an ambient air inlet to the chamber to allow ambient air to mix with the fuel droplets, an annular ambient air distribution ring having circumferentially spaced air distribution inlet holes, positioned upstream of the vaporization chamber, and having an axial outlet surrounding the fuel distributor, at least one turbulence generator in the chamber for creating ambient air turbulence for mixing fuel droplets and ambient air, at least one heater in the chamber to convert the fuel droplet-ambient air mixture to a homogeneous gaseous air-fuel mix as the mixture passes through the chamber, a heater controller operably associated with the heater and preset to regulate thermal output from the heater responsive to temperature of the gaseous air-fuel mix to prevent the temperature from exceeding that at which auto ignition would occur, and an outlet conduit from the chamber for flow of said air-fuel mix to an internal combustion engine.

20 Claims, 3 Drawing Sheets

FUEL VAPORIZER FOR AN INTERNAL COMBUSTION ENGINE

BACKGROUND OF THE INVENTION

This invention relates to a fuel vaporizer for an internal combustion engine.

A variety of mechanisms and devices have been proposed over the years for the purpose of increasing fuel use efficiency of internal combustion engines. There is still need for significant improvement in this regard. Additionally, the realization of the importance of less exhaust pollution has become a focal point in recent years. Therefore, a technical development which would accomplish significant advancement toward both of these goals would be laudable and welcome.

In prior U.S. Pat. No. 5,123,398 is disclosed a fuel gasifier which has certain advantages over the prior art. However, it employed an inner chamber where a rich gaseous mixture of fuel and air was created, and a driven propulsion impeller in this chamber which forced the rich mixture into an outer chamber where a lean mixture was created with additional air. The impeller as a moving driven part was an important component.

SUMMARY OF THE INVENTION

An object of this invention is to provide a unique fuel vaporizer that effects significant fuel usage efficiency and also lowers pollution levels from internal combustion engines, requiring no moving parts yet creating a homogeneous gaseous fuel and air mixture.

Another object of this invention is to provide apparatus to introduce combustion air into a stream of small droplets of fuel, evenly mixing that fuel and combustion air while simultaneously gasifying the mixture with the addition of heat prior to delivering the homogeneous fuel/air mixture to an engine for combustion.

A prototype was designed, fabricated and assembled to determine and demonstrate the invention's capability. The results included proven benefits in both fuel economy and less noxious pollutants. With the ignition in the on position and the engine cranking to create low pressure within the cylinders, several disparate actions begin which lead nanoseconds later to a very smooth running engine.

Ambient air is drawn through an intake valve and an air passageway into a vaporization chamber to meet the small sized fuel droplets ejected from a nozzle. The fuel droplets and ambient air are mixed, aided by induced turbulence, elevated to a homogeneous gas/vapor state using microprocessor controlled heat coils to provide latent heat vaporization, and delivered to combustion chambers of an internal combustion engine through a conventional distribution manifold.

Using the accepted principle of fuel plus air to provide the combustible mixture for running an internal combustion engine, the novel gasification/mixing device provides the features necessary to elevate the fuel/air mix to an impressive fuel/air gaseous mix with excellent economy, strong performance and low emissions.

A unique annular, air-distribution ring in the novel apparatus to create air turbulence and initiate excellent air and fuel mixing has also been shown to have the added safety feature of being able to snuff out backfiring.

The novel vaporizer coupled with control input and output devices has been shown via the prototype to be capable of meeting future demands imposed upon internal combustion engines by real applications such as automobiles.

DESCRIPTION OF THE PREFERRED EMBODIMENT

Figure 1:
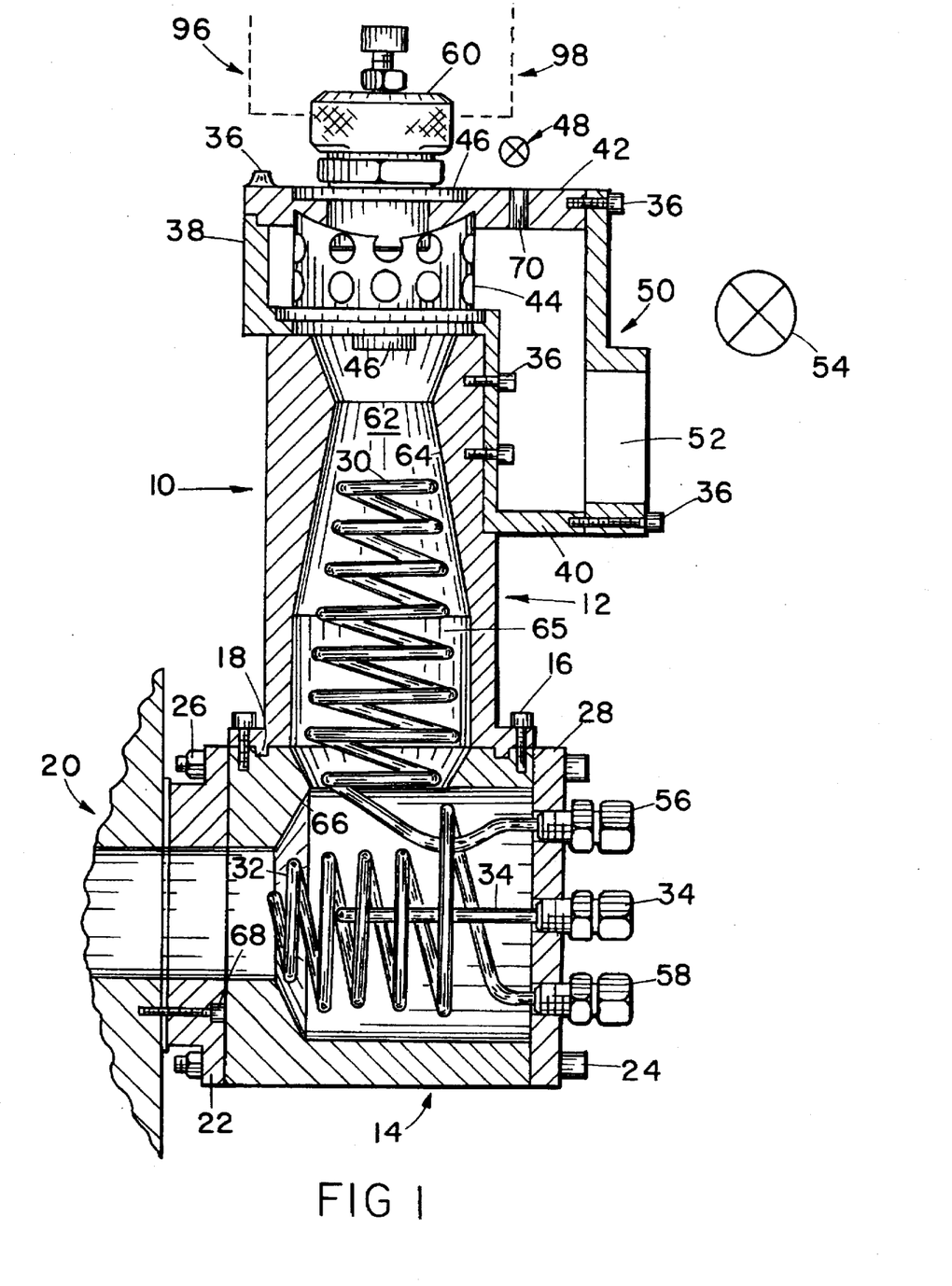
FIG. 1 is an elevational sectional view of the novel vaporizer.

Referring to FIG. 1, the fuel vaporizer/gasifier 10 is shown to include outer vertical and horizontal housings 12 and 14 formed from generally cylindrical bodies defining the peripheries of the housings. Housings 12 and 14 together define a fuel and air mixing and gasifying chamber 65 which is here shown to contain two interconnected portions. This vertical to horizontal arrangement was to accommodate the engine intake manifold of the prototype assembly. Housings 12 and 14 could be aligned and could be just one housing forming the one chamber. Within chambers 12 and 14 are heating elements 30 and 32 which provide sufficient heat to convert a mixture of small sized (preferably, less than 50 microns in diameter and more preferably less than 10 microns in diameter) fuel droplets supplied from a nozzle 60, and ambient air into a homogeneous gaseous state. The heating coils 30 and 32 shown in chambers 12 and 14 have a random configuration. The fuel droplet/ambient air mixture is preferably transformed by an exothermic addition of thermal energy combined with sufficient time elevating the fuel droplet/air mixture to a gaseous homogeneous fuel/air mixture. In this particular arrangement, two heater coils 30 and 32 are used. While this is advantageous, one coil or more than two heaters could be used, provided they are controlled as set forth hereinafter.

Housings 12 and 14 are formed to define a plurality of venturis 64 and 66 in chamber 65. Providing the plurality of venturis is advantageous to assure turbulence and uniform mixing of fuel and air, particularly when the gaseous mixture changes direction. The lower end of housing 12 is attached to underlying housing 14 by several cap screws 16. A seal between the housings is formed by machining an annular male ring 18 fitting into a corresponding annular female slot cut into the top of housing 14. Housing 14 serves several functions including that of 90° flow transition between primary housing 12 and the conventional internal combustion engine intake manifold 20. To aide mounting, an adapter plate 22 is shown mounted to the inlet of intake manifold 20 using cap screws 68 recessed beneath the machined surface of adapter plate 22. A fuel proof gasket is provided between adapter plate 22 and housing 14. Long bolts 24 pass through a cover plate 28, housing 14, adapter plate 22, and lock nuts 26 to secure gasifier 10 to intake manifold 20. Cover plate 28 is drilled and tapped to receive the connector ends of heating coils 30 and 32 and a process temperature sensor 34.

The upstream end of housing 12 is attached by cap screws 36 to transition housing members 38 and 40. An end cover plate 42 is attached to transition housing member 38 with cap screws, retaining an annular air distribution ring 44 securely in grooves machined into cover plate 42 and housing 12. An outer recess in cover plate 42 receives a cylindrical nozzle adapter assembly including nozzle 60 and a nozzle extension tube 46. Cover plate 42 is drilled and tapped to receive a control valve 48 (shown schematically)

to control ambient combustion air through an inlet 70 for engine idling. This valved air inlet can also be used for turbo-charged acceleration air. It could be used as an alternative to a throttle plate inlet 52 or in conjunction therewith. Annular ring 44 is generally cylindrical in cross section, with a series of air inlet openings around its periphery. These inlet openings can be circular, as shown, or of other shape such as elongated slots. The inflowing air shifts from flowing radially inward to axially down around the periphery of axially extending nozzle 46.

The evenly spaced holes in annular ring 44 have diameters such that the total cross sectional area, i.e., of each hole, times the number of holes, substantially equals the cross sectional area of inlet 52 or of a throttle plate 54. The unique construction of the annular ring serves to snuff out backfiring.

Upstream of the annular distribution ring 44 and attached to a housing 40 is a cover plate 50. The principal ambient air inlet 52 is in cover plate 50. Attached to cover plate 50 directly above inlet 52 is the main throttle body plate assembly 54 (shown schematically) for controlling ambient air supply.

The nozzle extension tube 46 adjacent zone 62 serves to both secure nozzle 60 within the device and also act as a barrier to ambient air passage across the tiny nozzle discharge droplets until just prior to the throat of venturi 64 and into turbulent mixing zone 62 of chamber 65. This barrier function effectively wards off undesired effects at the nozzle tip, and promotes decelerated and thorough, even mixing of ambient air and the small sized droplets once the turbulence generated by venturi 64 comes into play. The size and shape of the nozzle can vary. The preferred size is about 0.028 inch in diameter. The preferred spread angle is about 22°. Additionally, nozzle extension tube 46 works with annular distribution ring 44 in such a manner as to cause distribution of ambient air through the evenly spaced, circumferentially arranged holes in annular distribution ring 44. Due to the differing distances that different air molecules have to travel to reach the distribution holes from the lateral air inlet, coupled with the lower pressure environs of an intaking engine cylinder, a turbulent rotating air mass emerges from annular ring 44 and comes into mixing contact with the spreading, i.e., diverging, yet dense homogeneous stream of small sized fuel droplets emanating from nozzle 60, helping to diminish the droplet mass concentration just prior to the introduction of additional generated turbulence by the differential pressure areas associated with venturi 64. Turbulence is further enhanced by the tumbling caused by flow of the mixture through and around coils 30 and 32, along with additional pressure differential turbulence at the second venturi 66. The housing taper in the initial gasification/ mixing housing 12, downstream of venturi throat 64, is also preferably 20° to correspond with the spray spread and shape of nozzle 60. Nozzle 60, chosen for the prototype device because of its spread angle and its capacity in gallons per hour at specified differing PSIG air inputs, is preferably a Model SU2A from Spraying Systems Co., P.O. Box 7900, Wheaton, Ill. 60189-7900 U.S.A. However, many different nozzles could be used to deliver small sized droplets of fuel. The respective spray pattern angle would influence the corresponding taper in housing 12. Air from a dedicated air pressure source is delivered to the nozzle via an electronic air pressure regulator with a preset initial air pressure value and preset pressure range values. Determination of the preset initial air pressure to be delivered to the nozzle is dependent on desired nozzle fuel output. Fuel output is largely a function of fuel viscosity and siphon height or gravity head to the fuel reservoir and air pressure through the nozzle.

Coils 30 and 32 are secured to and have their leads extend through cover plate 28. Also secured to and having its lead extend through cover plate 28 is the temperature sensor 34. Integrated within coils 30 and 32 are temperature sensors 56 and 58. A combination of coil types is possible. Heated liquid (>140° F.) could be used as a heat transfer medium in either or both coil 30 and coil 32. Alternatively, either or both coils 30 and 32 could be the preferred choice, which is electrical resistance heating coils. Development favored the use of electrical resistance coils with microprocessor burst firing control. Three such sensors are shown in FIG. 1. Process temperature sensor 34 works in conjunction with the microprocessor controlling the firing of coils 30 and 32, while sensors 56 and 58 which are an integrated part of coils 30 and 32 act as sensors which, in combination with power limiters, set high temperature limits for coils 30 and 32.

As noted previously, housing 14 is shown at 90° to housing 12 to facilitate the flow of the gaseous fuel/air mixture from the prototype gasifier 10 to an existing internal combustion intake manifold 20. In other applications housings 12 and 14 could be arranged linearly or combined as one housing to accommodate physically different intake manifold configurations, as described above.

In operation, heat is supplied by coils 30 and 32. Tiny micron sized fuel droplets and a small amount of air are supplied by nozzle 60. As the engine turns over, a partial vacuum within the combustion chamber draws ambient air past idle control valve 48 through the distribution holes in annular distribution ring 44 to the zone or region 62 past the end of nozzle adapter assembly 46 where it is entrained with the dense flow, small sized fuel droplets coming from nozzle 60. Turbulence in the ambient air caused by flow through the annular distribution ring 44, augmented by turbulence generated by differential pressure associated with venturi 64, initiates the mixing of the small sized fuel droplets together with ambient idle air. Additional turbulence is provided by collision with the downstream coils 30 and 32. Mixing continues to be aided by pressure differential generated by venturi 66. As the fuel/air mixture tumbles through the influence of coil 30, heat of vaporization is absorbed both by direct collision with and radiation from coil 30, beginning the exothermal reaction leading to the homogeneous, gaseous entrained air-fuel mixture.

Figure 2:
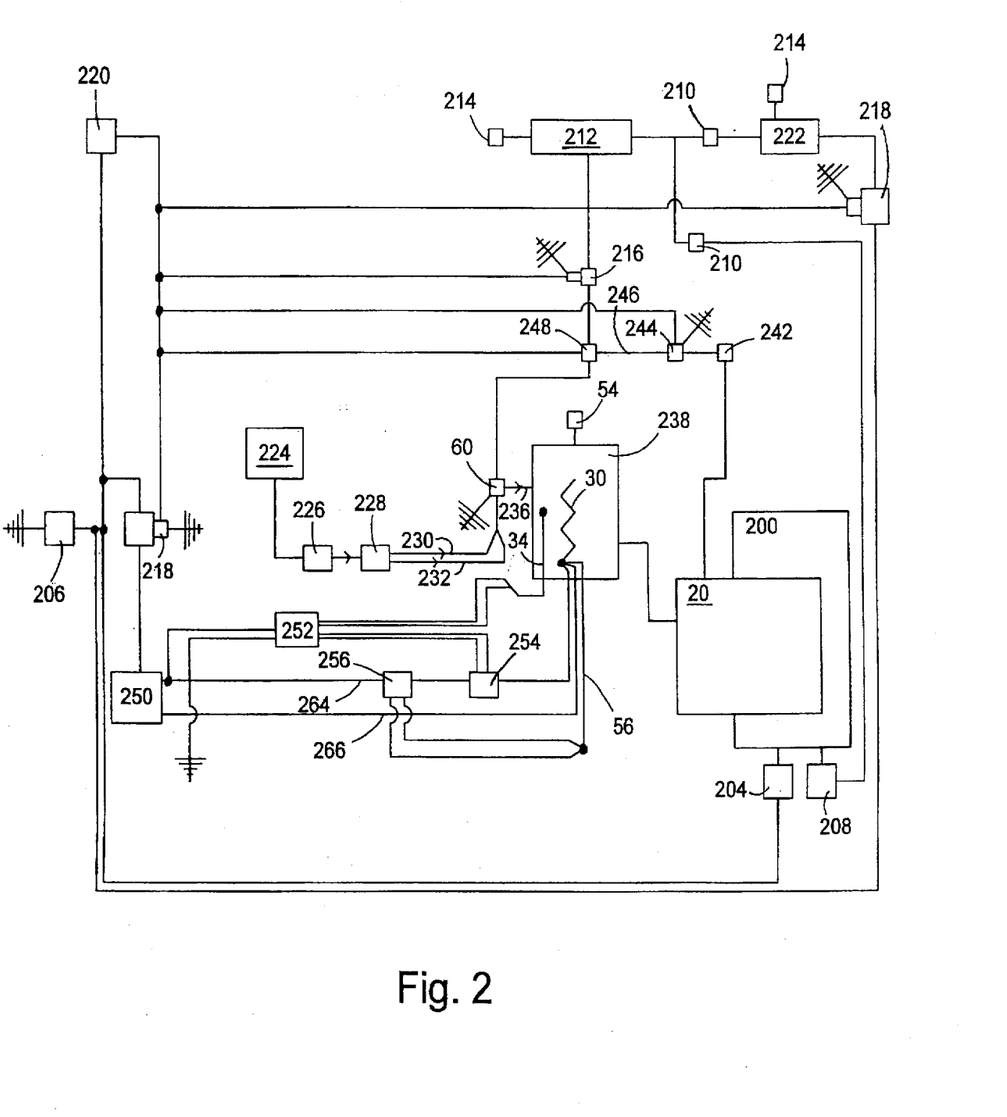
FIG. 2 is a schematic block diagram of a combination engine and vaporizer system including computer processor controls according to a first embodiment of the present invention.
Figure 3:
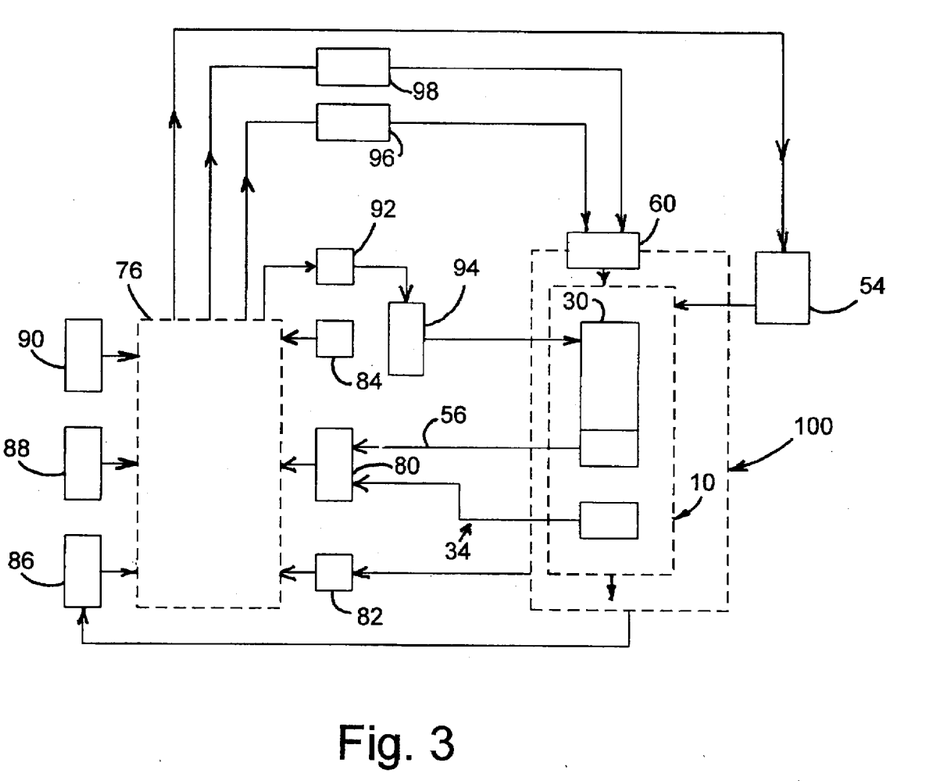
FIG. 3 is a schematic block diagram of the vaporizer control system according to a second embodiment of the present invention.

The manner in which fuel and air pressure are controlled for supply to nozzle 60 and the manner in which heater coils 30 and 32 are controlled is described below with reference to the first embodiment of the control system of the present invention as shown in FIG. 2 and the second embodiment as shown in FIG. 3. The control system shown in FIG. 2 represents computerized controls and inverted 120v, A.C. electrical circuitry used to run the prototype vaporizer/ engine combustion.

Listed by number are the following prototype components used in the first embodiment as shown in FIG. 2:

200 Internal combustion engine
20 Intake manifold of internal combustion engine
204 Engine driven alternator
206 12v DC battery
208 Engine driven air pump
210 Check valves
212 Air storage tank
214 Pressure relief valves (2)
216 NC 12v DC solenoid
218 NC 12v DC continuous duty solenoid (2)
220 Ignition switch 222 Auxiliary air pump
224 Fuel tank
226 Fuel pump
228 Fuel metering device
230 Idle fuel
232 Run fuel conduit
60 Nozzle (SU2A Spraying Systems Co., Wheaton, Ill.)
236 Injector of micron droplet fuel/air mixture
54 Ambient air control valve
242 Vacuum diaphragm
244 Piezo-electric device
246 Variable voltage signal
248 Electro-pneumatic pressure regulator from Control Valves, Inc., Dallas, Tex.
250 12v DC to 120v AC converter
252 Microprocessor-based Auto Tuning Control from Watlow Controls, Winona, Minn.
254 Solid state relay control from Watlow Controls, Winona, Minn.
256 Temperature limit/Control from Watlow Controls, Winona, Minn.
258 Air line
30 120v AC cable resistance heater w/internal "J" thermocouple from Watlow World Headquarters, St. Louis, Mo.
34 "J" thermocouple sensor from Watlow Gorcon, Richmond, Ill.
56 Thermocouple leads from heater coil 30
264 120v A.C. power lead $L_1$
266 120v A.C. power lead $L_2$ The controlled quantities of ambient air and tiny fuel droplets will change, often very rapidly, as demands placed upon the internal combustion engine change. The more demand placed upon the engine, the more ambient air, fuel droplets and thermal energy required. Conversely, lessening demands require less fuel, less air, and less thermal energy. Rapidly changing demands, such as are experienced when the internal combustion engine is used as a source of power for an automobile, require very rapid response times for control of, in particular, fuel demands and thermal energy supplied by the heating coils. Excessive coil temperature could result in auto-ignition of the fuel/air mixture. Computerized controls assure performance and safety within a rapidly changing engine demand environment.

Fuel/air gasifiers as illustrated by the proposed invention require sophisticated controls to respond quickly and safely to changing engine demands. Experience working with the prototype has shown that instantaneous engine starting, fuel economy and low emissions require rapid change in the exothermic heat of vaporization supplied during the gasification process. A steady source of heat of vaporization was tried and proved to be unacceptably slow in meeting low emission engine starts. 12v DC heat sources were attempted but proved to also be slow in providing sufficient thermal output to complete gasification during high engine demand, due to unacceptably high amperage demands on the 12v DC system. 120v AC, 220v AC and 440v AC resistance heaters were known to provide sufficient thermal-output but were initially thought to perhaps be too uncontrollable.

Design criteria called for finite control of fuel droplets regardless of engine performance demands. The resultant solution called for finite control of small small sized fuel droplets coupled with finite control of heat of vaporization needs within the safety limits imposed by fuel auto-ignition temperatures. Microprocessor controls were therefore provided to meet finite control and safety.

Thermal energy supplied to the fuel/air gasifier to provide exothermic heat of vaporization results from distributed wattage along the two cable heaters 30 and 32 within the gasification chamber. These resistance heaters operate at 120v AC and are capable of attaining 1100° F. interior temperatures and equally hot surface temperatures within seconds of receiving power. Limiting supplied voltage results in temperature control so that safety limits, i.e., fuel auto-ignition temperatures, are not exceeded, but also limits BTU output when less heat of vaporization is needed. Control of thermal energy at needed but safe levels is achieved by monitoring the temperature of the gaseous fuel/air mixture. Safety limits, set below fuel auto-ignition temperature, are assured by placing a temperature limit controller 256 in series between the power source 250 and the solid state firing relay 254. The temperature limit control 256 receives input from "J" thermocouple sensors 56 and 58, which measure internal coil temperatures and are embedded within resistance coils 30 and 32, respectively. Preset limits within the control 256 are compared to actual coil temperatures, and if exceeded, power is denied to the firing relay 254 and to the coil until coil temperature drops below the preset safety temperature. Thus, microprocessor power controls keep coil temperatures within safety limits (<450° F., for example) imposed by fuel auto-ignition temperatures. Because fuel auto-ignition temperatures vary based on fuel composition (i.e., gasoline auto-ignites at 450° F., while methanol auto-ignites at temperatures in excess of 800° F.), different safety limits may be imposed for different fuels.

If preset temperature limit safety criteria are met, power is supplied to the firing relay 254. The auto tuning control 252 determines how long the coil 30 is to be fired (duration) at full power to achieve a process temperature set in the auto tuner 252, which is compared to input temperature from a "J" thermocouple sensor 34 inserted near the end of the gasification chamber within the gasifier. The solid state firing relay burst fires the coil at the zero point on the sinusoidal wave associated with 120v AC 60 cycle current. This zero firing effectively controls temperature overshoots and adds tremendously to the life of the resistance heaters. The thermal process temperature set into auto tuner 252 may be set to reflect driving demands (i.e., load and ambient outside air conditions).

Temperature sensor 34 senses the temperature of the combustion mixture of small sized fuel droplets introduced into gasification housing 12 through inlet conduit 46 and entrained with ambient air passing through annular air distribution ting 44 from inlet air controls 54 and 48 and turbulence zone 62. Temperature sensor 34 supplies the sensed temperature of the combustion mixture to the microprocessor in auto tuning control device 252. The microprocessor compares this sensed temperature to a preprogrammed default temperature of, for example, a temperature in the range of 100° to 225° F., and outputs a 4–20 mA signal to a microprocessor in a firing relay control 254, which time proportions the electrical current passed through resistance coils 30 and 32. The turbulent mixture of ambient air and tiny fuel droplets absorbs thermal energy from coils 30 and 32, through radiation and/or through direct collision with coils 30 and 32, sufficient to complete the vaporization (gasification) conversion prior to entering engine intake manifold 20.

The fuel droplets are introduced by an injector, preferably nozzle 60, with the aid of a small amount of air called "assist air." Pressure increases in nozzle air will cause a corresponding increase of fuel from a metered source 228. To facilitate changes in air pressure to meet changing engine fuel needs, the direct relationship between engine load and engine vacuum is utilized. Greater load creates less engine vacuum. Conversely, lessening loads increase vacuum. A vacuum diaphragm 242 attached to a resistance spring operates a mechanical linkage attached to a piezo-electric device 244. Vacuum increases decrease the variable voltage generated by piezo-electric device 244. Conversely, dropping engine vacuum (under load) causes increasing variable voltages. The variable voltage operates as a signal 246 to an electro-pneumatic air pressure regulator 248 having a microprocessor, which regulates air pressure dependent upon input voltage signals 246 from piezoelectric device 244. An initial set point and total pressure range preset in the microprocessor of electro-pneumatic air pressure regulator 248 allow for variable pressure changes to nozzle 60 to be dependent upon engine loading. Throttle position and change in throttle movement, both in direction and speed, could be translated as input signals to provide even more finite control of assist air, as illustrated in FIG. 3 and described in greater detail below. These components are more specifically described hereinafter.

Changing engine demands as experienced during the acceleration or deceleration of an automobile require changes in the delivery rate and quantity of fuel/air mixture to the engine combustion chamber. Fuel needs are reflected by the nature of the fuel/air mixture supplied to the combustion chamber. Many different air to fuel ratios will ignite. Experience has shown that a much leaner (less fuel) air-fuel mixture will burn more completely (less pollutants) if that mixture is in the gaseous state. To achieve the goal of nearly 100% combustion of the fuel/air gaseous mixture requires two general conditions. Firstly, very small fuel droplets of preferably less than 10 microns in diameter, must be entrained with ambient air. Secondly, this mixture of air and very small fuel droplets must be subjected to an external source of heat adequate to change the mixture to a homogeneous gaseous state.

Referring specifically to the schematic diagram in FIG. 2, fuel is delivered to a metering device 228 from a source 224 using a positive pressure pump 226. The pump may be dependent upon nozzle injector 60 to be of either constant or variable pressure. Dependent upon nozzle injector 60 type and engine idle demand, idle fuel may have to be metered and supplied through conduit 230 independent of power engine demands. Increased demand for fuel may require additional metering of fuel through parallel conduit 232.

In the prototype, nozzle injector 60 of external mix siphon feed was chosen for its small micron-sized liquid droplet performance characteristics. Such a nozzle requires a small mount of air to accomplish the production of small micron fuel droplets. Many other nozzle types using changing liquid pressure, with or without air assistance, to mechanically produce small droplets, could be used. Air to assist in nozzle injector functioning is supplied from an air tank 212 with its pertinent filtration and pressure relief valve 214. This air supply is controlled as on or off by a 12v DC solenoid valve 216 wired to the ignition switch. Air supply to air tank 212 is provided by an auxiliary air pump 222 or, if the engine is running, by an engine driven air pump 208.

When the ignition is turned on, circuits are opened allowing air passage from the tank through solenoid 216 to the electro-pneumatic pressure regulator 248. This device allows for changing air pressure to nozzle-injector 60. A variable voltage and/or milli-amp signal in line 246 (the prototype uses variable voltage 0–10v DC) is generated by piezo-electric device 244 coupled to a vacuum diaphragm 242, which is in turn connected to the intake manifold 20. Once the engine has fired and remains at idle, vacuum diaphragm 242 resists spring tension to influence the piezo-electric device 244, sending a steady signal to the electro-pneumatic regulator 248 which has been set to supply, together with metered fuel in conduit 230, the precise amount of air necessary to provide a very lean, low-pollution-producing fuel/air mixture to gasification device 10. Once engine demand changes as during acceleration, a resultant instantaneous drop in engine vacuum occurs, causing the spring in vacuum diaphragm 242 to advance the movement of the sliding wire in piezo-electric device 244, which in turn instantaneously increases the voltage signal to electro-pneumatic pressure regulator 248, allowing for an increase in air pressure to nozzle-injector 60 facilitating increased fuel flow. Engine demand changes could also be initiated by throttle valve 54 changes or load changes such as are experienced when automobiles go up or down a hill. Experience has shown that additional input from device 244 associated with throttle movement, throttle speed and throttle position helps to fine tune the fuel delivery system.

Opening and closing ambient air control valves 48 and 54 initiates immediate changes in engine vacuum which is reflected by changes in the amount of fuel droplets generated by nozzle 60. Decreasing engine demand leads to decreases in the amount of fuel delivered. Less fuel passing through coils 30 and 32 requires less energy for the mixture to remain at a preset mixture temperature as sensed by sensor 34. Excess thermal energy causes an increase in mixture temperature which triggers a change in the sensor 34 signal to the computer. Deviation upward from the preset default temperature, which may be between 100° to 225° F., for example, causes a signal change to the firing control relay 254 causing a time-proportional slow down in the energizing of the electrical resistance coils 30 and 32, resulting in lower coil temperatures with less thermal output. Should coil temperatures reach a safety temperature maximum (e.g., 450° F.) set below fuel auto-ignition temperature, signals generated continuously by sensors 56 and 58 would activate circuitry in temperature limit controls 256 to interrupt power flow to coils 30 and 32.

The preferred embodiment of the gasifier thus provides a device for injecting small micron sized fuel droplets, means to entrain the fuel droplets with ambient air, and a gasification chamber together with heating coils for vaporizing the entrained fuel/air mixture to a gaseous state. These components could include physical shape variations to accommodate differing engine intake requirements. The preferred components illustrated in FIG. 2 as reflecting the prototype employs computer control of fuel delivery and heating coil performance. The gasifier can be built to perform safely using mechanical controls, liquid heat mediums within the coils and standard, off-the-shelf explosion-proof solenoids. The prototype uses various segregated microprocessors to control fuel flow and heating coil thermal output. An invertor changing 12v DC current to 120v AC current maximizes heating coil performance. Treating the gasification process as a thermal process utilizing microprocessor controlled, electrical resistance heaters, together with temperature limit controllers, assures safe, efficient, responsive heating coil performance below fuel auto-ignition temperatures.

The gasification process is further aided as the mixture continues past coil 32. The resulting homogeneous gaseous air-fuel mixture which arrives at the combustion chamber provides more complete combustion than today's carburetor and injector mixtures. Experimentation has shown that the engine fires immediately and continues to run smoothly. Changes in engine demand are reflected as changes in fuel/air demand. Providing sufficient engine power to accelerate requires increased engine rpm's. Specifically, the throttle plate 54 is opened for increased air flow, causing a decrease in engine vacuum. These engine vacuum changes acted upon the vacuum diaphragm 242 causing mechanical diaphragm movement which is translated by piezo-electric device 244 into a changing voltage signal sent to electro-pneumatic regulator 248. Electro-pneumatic regulator 248 through its microprocessor, using preset initial pressure and pressure range, regulates air pressure output from a high pressure storage tank 212. Increased engine demand such as is experienced during acceleration is accompanied by an immediate decrease in engine vacuum. Combining a vacuum diaphragm 242 coupled to a piezo-electric sliding wire device 244 provides an immediate variable input signal to electro-pneumatic pressure regulator 248 indicative of engine demand as reflected by engine vacuum. Engine vacuum decreases are reflected as fuel increases. As automobile momentum change rates are met, less fuel is required to maintain established momentum. Less engine demand provides greater engine vacuum, less air pressure to nozzle 60, and decreased fuel.

FIG. 3 shows a second embodiment of the present invention. Control of the invention 10 could be safely and efficiently performed by a fast (preferably 32 bit architecture) central processing unit (CPU) 76 receiving thermal inputs 80, exhaust inputs 82, ambient air inputs 84, engine inputs 86, fuel inputs 88 and assist air inputs 90. Thus, the various segregated microprocessor functions of the first embodiment may be embodied and performed by a single CPU 76. CPU 76 generates and supplies an output control signal to heater firing relay 94 and temperature limiter 92 efficiently for safely firing heaters 30 and 32. Additional CPU output control signals are supplied to electronic controllers 96 and 98 (FIGS. 1 and 3) which in turn regulate fuel flow rates to injector nozzle 60. Ambient air inlet control valve 54 receives another control signal output by CPU 76 to complete the control and management of ambient air, fuel and thermal energy embodied in vaporizer 10 to power internal combustion engine 100. Inputs from sensors 34, 56 and 58 in combination with other pertinent data, as illustrated in FIG. 3, could be digitally processed to heat generation by coils 30 and 32 regardless of engine demands and/or ambient air temperature/pressure changes.

As illustrated in FIG. 3, in addition to signals generated by devices coupled to engine vacuum, signals reflecting throttle position, throttle position change rate, outside air temperature, barometric pressure and engine operating temperature could, in combination with coil temperature inputs and process temperature inputs, be computed by CPU 76 or a "fuzzy logic" board to provide immediate finite control signals. These outputs sent to controllers would insure maximization of performance and economy while simultaneously minimizing exhaust pollutants.

Another possible method of process control would include additional inputs and fuzzy logic control outputs to firing and limit controls. Variables such as, but not limited to, relative humidity, fuel type or composition, throttle movement, coolant temperature, cylinder head temperature, exhaust gas temperature, manifold vacuum and density altitude would, if inputted to a fuzzy logic board, allow for outputs to controllers capable of infinite adjustments to the fuel/air gasifier. Such infinite control would shorten response time, increase engine power and keep pollutants at a very low level regardless of engine demands.

These and various other modifications could be made to the illustrated and presently preferred embodiments depicted without departing from the inventive concept. Therefore, the invention is not intended to be limited to the illustrated embodiments shown, but only by the scope of the appended claims and the equivalents thereto.

The embodiments of the invention in which an exclusive property or privilege is claimed are defined as follows:

1. A fuel vaporization device for an internal combustion engine comprising:

a housing defining a vaporization chamber;

a liquid fuel inlet to said chamber including a fuel distributor having the capacity to inject tiny fuel droplets into said chamber;

an ambient air inlet to said chamber to allow ambient air into said chamber to mix with said fuel droplets;

at least one turbulence generator in said chamber for creating ambient air turbulence for mixing fuel droplets and ambient air within said chamber into a fuel droplet ambient air mixture;

a second turbulence generator including means, positioned upstream of said vaporization chamber, for generating turbulence between said ambient air inlet and said vaporization chamber;

at least one heater in said chamber to convert the fuel droplet-ambient air mixture to a homogeneous gaseous air-fuel mix as said mixture passes through said chamber;

a heater controller operably associated with said heater and preset to regulate thermal output from said heater responsive to temperature of said gaseous air-fuel mix to prevent a temperature of said heater from exceeding that at which auto ignition would occur; and an outlet conduit from said chamber for flow of said air-fuel mix to an internal combustion engine.

2. A fuel vaporization device for an internal combustion engine comprising:

a housing defining a vaporization chamber;

a liquid fuel inlet to said chamber including a fuel distributor having the capacity to inject tiny fuel droplets into said chamber;

an ambient air inlet to said chamber to allow ambient air into said chamber to mix with said fuel droplets;

at least one turbulence generator in said chamber for creating ambient air turbulence for mixing fuel droplets and ambient air within said chamber into a fuel droplet ambient air mixture;

at least one heater in said chamber to convert the fuel droplet-ambient air mixture to a homogeneous gaseous air-fuel mix as said mixture passes through said chamber;

a heater controller operably associated with said heater and responsive to temperature of said gaseous air-fuel mix to prevent a temperature of said heater from exceeding that at which auto ignition would occur; and an outlet conduit from said chamber for flow of said air-fuel mix to an internal combustion engine, wherein said ambient air passageway includes an annular ambient air distribution ring having circumferentially spaced air distribution inlets, positioned upstream of said vaporization chamber, and having an axial outlet surrounding said fuel distributor.

3. The fuel vaporizer in claim 2 wherein said fuel distributor has an outlet for said fuel droplets downstream of said air distribution ring whereby said fuel droplets are physically separated from said ambient air flow at said annular ambient air distribution ring.

4. The fuel vaporizer in claim 1 wherein said fuel distributor is located to inject said fuel droplets into said ambient air upstream of said turbulence generator in said vaporization chamber.

5. The fuel vaporizer in claim 1 including an ambient air flow control valve to regulate the rate of flow of ambient air through said ambient air inlet.

6. A fuel vaporizer in claim 4 including a fuel controller to control the rate of flow of fuel from said fuel distributor.

7. The fuel vaporizer in claim 6 whereby said fuel rate of flow is correlated directly to engine need.

8. The fuel vaporizer in claim 6 wherein operation of said heater controller is correlated to said fuel rate of flow to assure a homogeneous, gaseous air-fuel mix.

9. The fuel vaporizer in claim 1 wherein said heater controller is set to deactivate said heater to prevent the temperature of said heater from meeting or exceeding said auto-ignition temperature of said homogeneous gaseous air-fuel mix.

10. The fuel vaporizer in claim 7 including a controller for receiving multiple signal inputs from an engine and from said heater to produce processed outputs to manage fuel flow rates and heater thermal generation.

11. The fuel vaporization device as defined in claim 1, wherein said heater controller includes:
    means for comparing the temperature of within said vaporization chamber to a predetermined threshold temperature representing a temperature at which said gaseous air-fuel mix will auto-ignite; and
    means for reducing the supply of power to said heater when the temperature exceeds the predetermined threshold temperature.

12. The fuel vaporization device as defined in claim 1, wherein said means for generating turbulence includes an annular ambient air distribution ring having circumferentially spaced air distribution inlets and having an axial outlet surrounding said fuel distributor.

13. A fuel vaporizer for an internal combustion engine comprising:
    a housing having a vaporization chamber, an ambient air inlet, and a flow outlet for fuel/air mix to an internal combustion engine;
    said housing having a fuel inlet in said housing having a nozzle to inject fuel droplets less than 50 microns in diameter into said vaporization chamber;
    said fuel inlet including a fuel droplet isolation conduit arranged to limit entrainment of injected fuel droplets by the ambient air until such ambient air and fuel droplets independently reach said vaporization chamber;
    a turbulence zone within said vaporizer for assisting homogeneous mixing of said ambient air and fuel droplets;
    at least one heater in said vaporization chamber capable of generating sufficient heat to elevate the temperature of said ambient air and fuel droplets to a homogeneous air-fuel gas mix;
    a series of sensors to detect ambient air temperature, gaseous air-fuel mixture temperature and heater temperature;
    a valve for controlling ambient air intake to said vaporizer chamber;
    an ambient air distribution ring having air flow openings which, in combination with said fuel droplet isolation conduit, contributes to the turbulence in the turbulence zone by the flow of ambient air through the openings in said air distribution ring; and
    a computer processor to compare inputs to preset defaulted values and to output signals to fuel and thermal output controllers.

14. A fuel vaporizer for an internal combustion engine comprising:
    a housing defining a vaporization chamber;
    an ambient air inlet to said vaporizer chamber;
    an ambient air inlet control valve;
    a turbulence generator ring between said ambient air inlet and said vaporization chamber for turbulent ambient air passage to said vaporization chamber;
    a liquid fuel inlet having a liquid fuel injector capable of introducing tiny fuel droplets of combustion fuel into said vaporization chamber;
    said vaporization chamber having at least one venturi to add further turbulence;
    at least one heater in said vaporization chamber to generate sufficient thermal output for conversion of the fuel droplets to a gas and thereby change the physical state of an air-fuel mixture therein to a homogeneous gas;
    sensors located to sense heater output temperature, air-fuel mixture temperature and changing fuel needs; and
    a microprocessor operably connected to said sensors, to said ambient air control valve, to said liquid fuel injector, and to said heater to process sensor inputs and to control air and fuel inflow and heater output.

15. A fuel vaporizer for an internal combustion engine comprising:
    an ambient air inlet to said vaporizer;
    an air control valve for said air inlet;
    a fuel inlet to said vaporizer comprising means for injecting small fuel droplets to said fuel inlet;
    means for physically maintaining said ambient air and said fuel droplets in a separated condition prior to entry into said vaporization chamber;
    a series of radial air inlet holes, venturis and random pattern heaters each contributing to generate turbulence to aid in blending small fuel droplets with ambient air;
    a supply of heat energy within said chamber;
    a chamber length sufficient to assure vaporization of the air-fuel mixture to a homogeneous air-fuel gas;
    a series of temperature sensors to detect vaporization chamber temperature and heater temperature and to output signals representative thereof;
    at least one performance sensor to output engine performance signals, at least one of said output engine performance signals representing engine vacuum; and
    control means coupled to said temperature sensors, to said performance sensor, and to said supply of heat energy, for controlling said supply of heat energy in response to said output signals from said temperature sensors, and for regulating the supply of air and fuel in response to said output engine performance signals.

16. The fuel vaporization device as defined in claim 15 and further including:
    pressurized air supply means for supplying variably pressurized air to an air assist inlet of said means for injecting small fuel droplets in order to assist in the supply of fuel droplets to said vaporization chamber, wherein said control means is coupled to said pressurized air supply means for changing the pressure of the air supplied to said air assist inlet in response to a sensed change in engine vacuum.

17. The fuel vaporization device as defined in claim 15, wherein said series of radial air inlet holes are positioned upstream of said vaporization chamber, for generating turbulence between said ambient air inlet and said vaporization chamber.

18. The fuel vaporization device as defined in claim 17, wherein said series of radial air inlet holes are formed in an ambient air distribution ring having an axial outlet surrounding said fuel inlet.

19. A fuel vaporizer for an internal combustion engine comprising:

a housing defining a vaporization chamber;

an ambient air inlet to said vaporizer chamber;

a turbulence generator between said ambient air inlet and said vaporization chamber for turbulent ambient air passage to said vaporization chamber;

a fuel inlet having a fuel injector capable of introducing tiny fuel droplets into said vaporization chamber;

at least one heater in said vaporization chamber to generate sufficient thermal output for vaporizing the fuel droplets to create a homogeneous air-fuel mixture;

sensors located to sense heater temperature within the vaporization chamber and changing fuel needs; and control means operably connected to said sensors, to said fuel injector, and to said heater to process sensor inputs and to control air and fuel inflow and heater output.

20. The fuel vaporizer as defined in claim 19, wherein said turbulence generator is shaped in the form of a ring.

* * * * *